Dec. 25, 1962 W. G. MOEHLENPAH ETAL 3,069,684
APPARATUS FOR FABRICATING WOOD STRUCTURES
Filed March 13, 1961 9 Sheets-Sheet 1
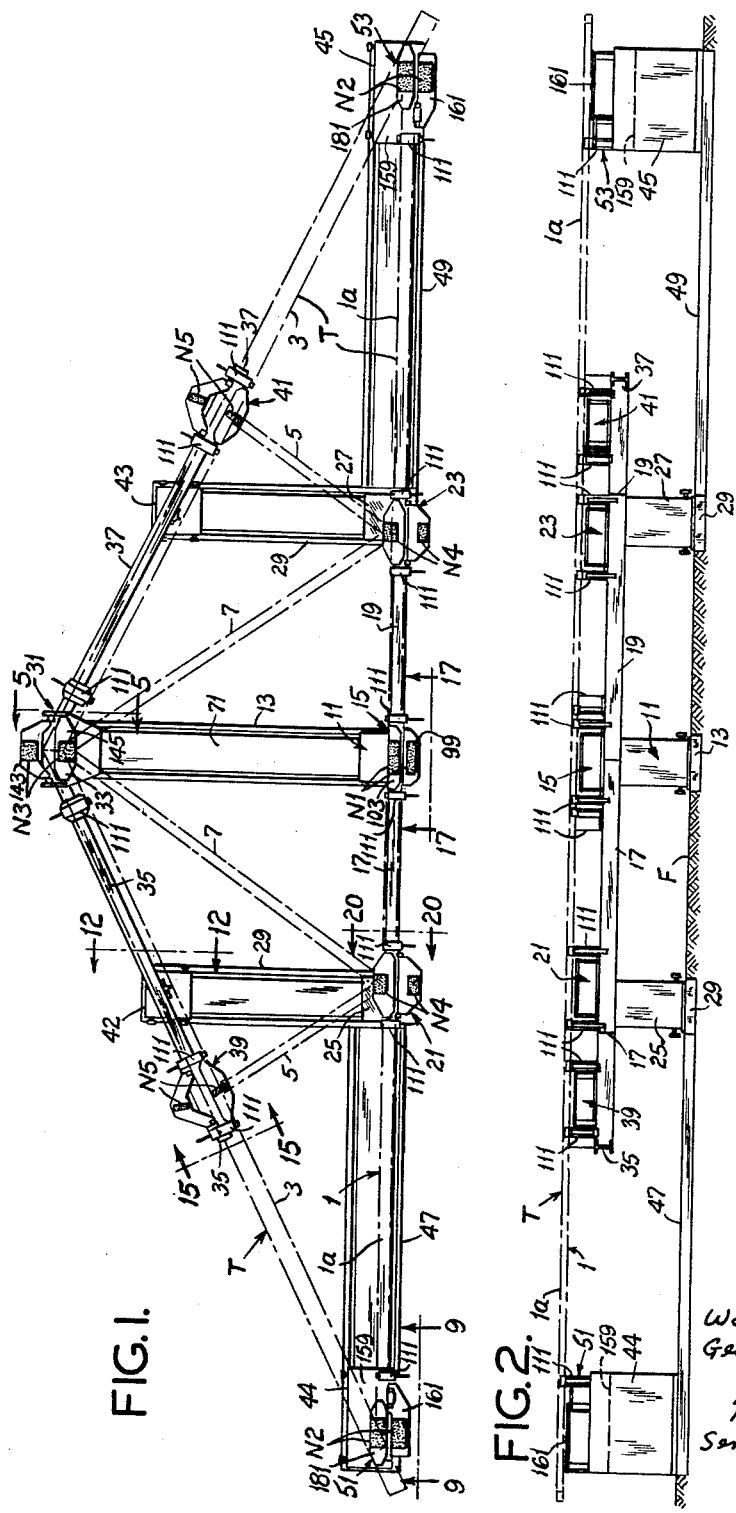
Walter G. Moehlenpah,
George E. Pallme, Jr.,
Inventors.
Koenig, Pope,
Senniger and Powers,
Attorneys.

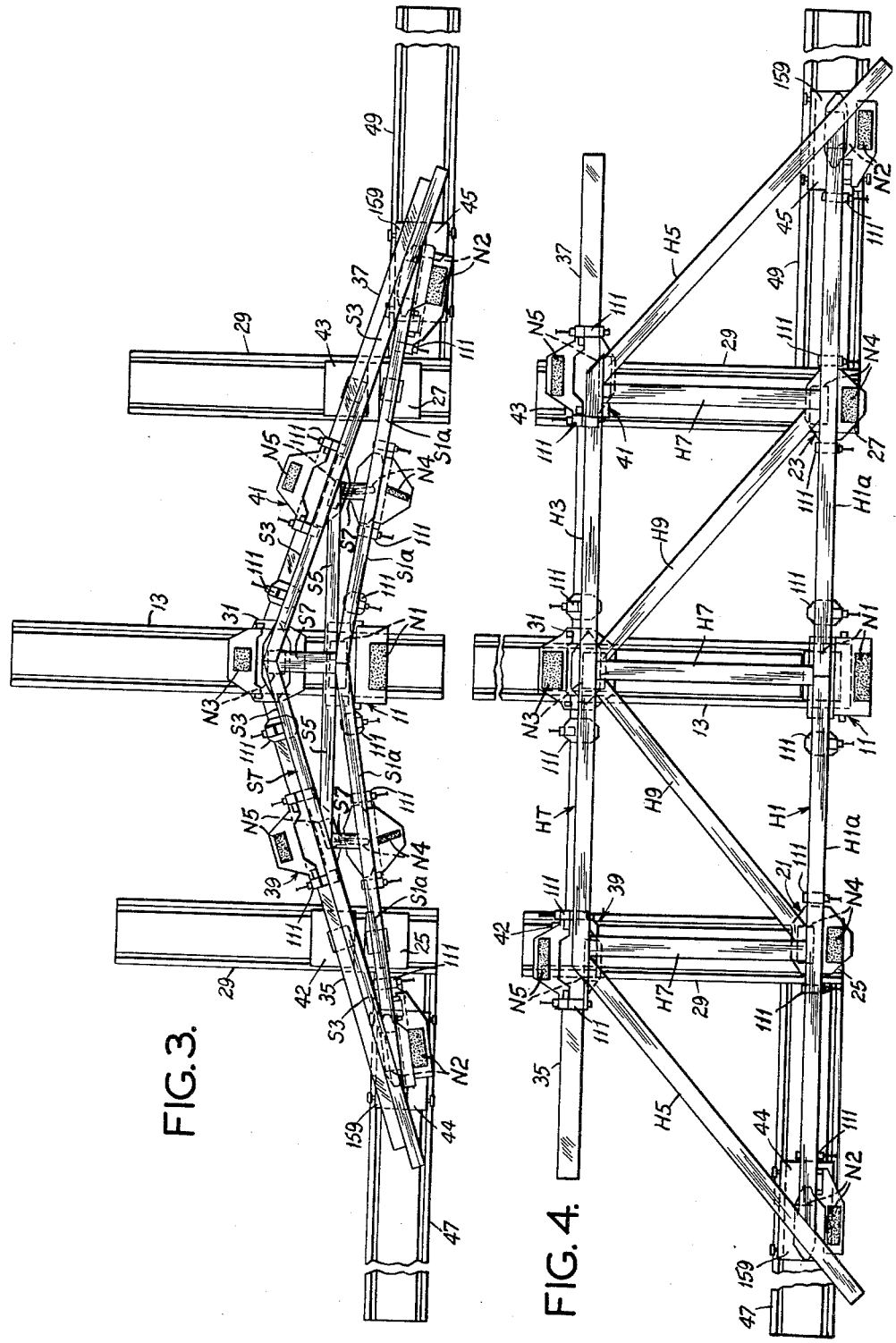

FIG. 6.
FIG. 5.
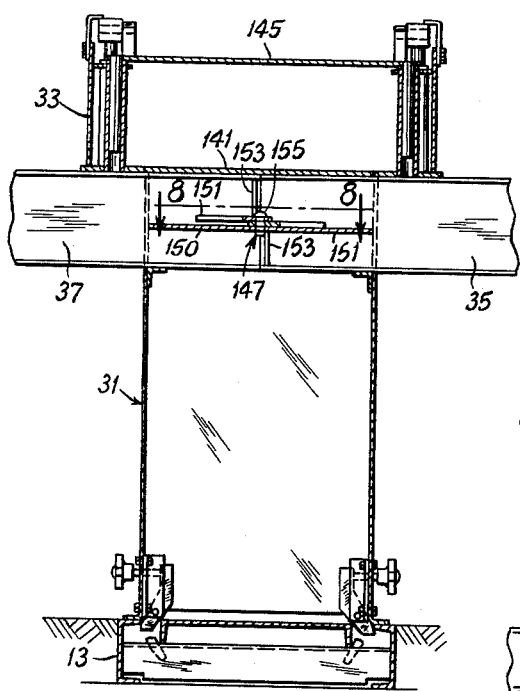
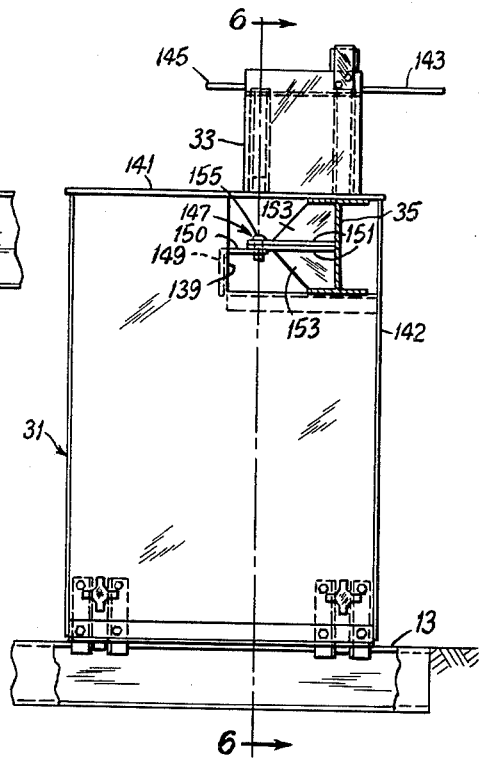
FIG. 7.
FIG. 8.
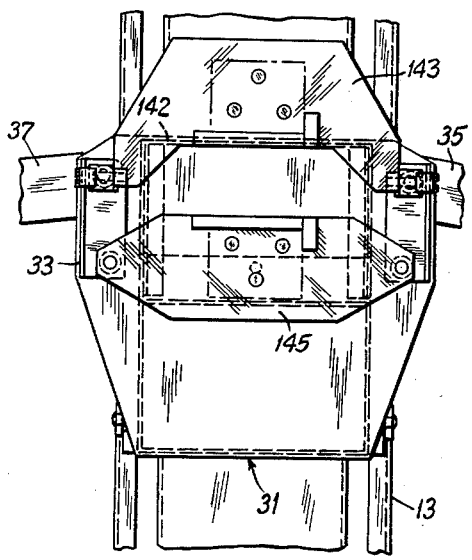
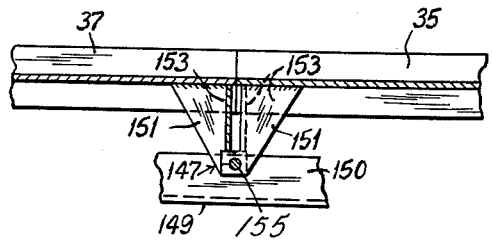

Dec. 25, 1962 W. G. MOEHLENPAH ETAL 3,069,684
APPARATUS FOR FABRICATING WOOD STRUCTURES
Filed March 13, 1961 9 Sheets-Sheet 4
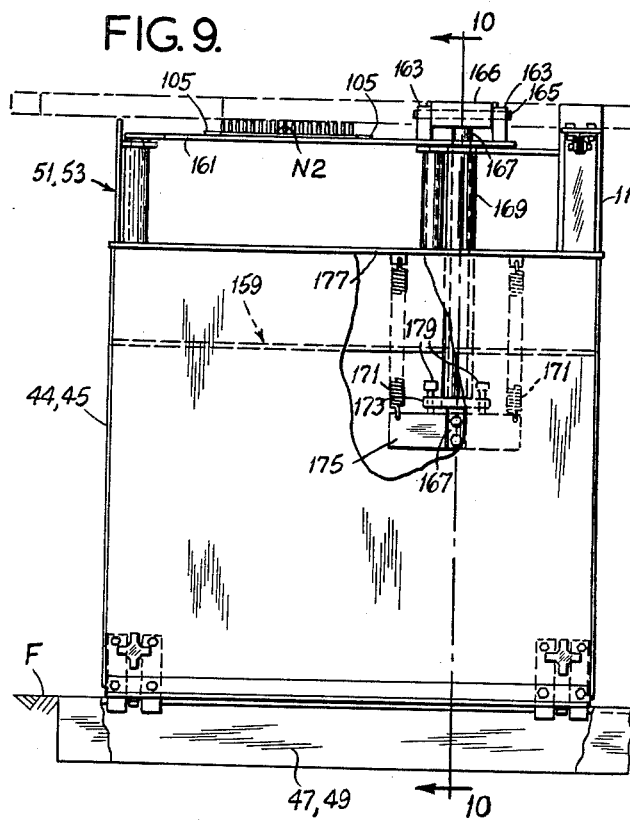
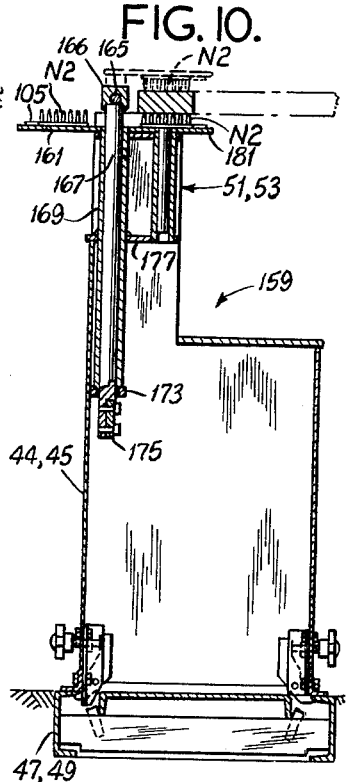
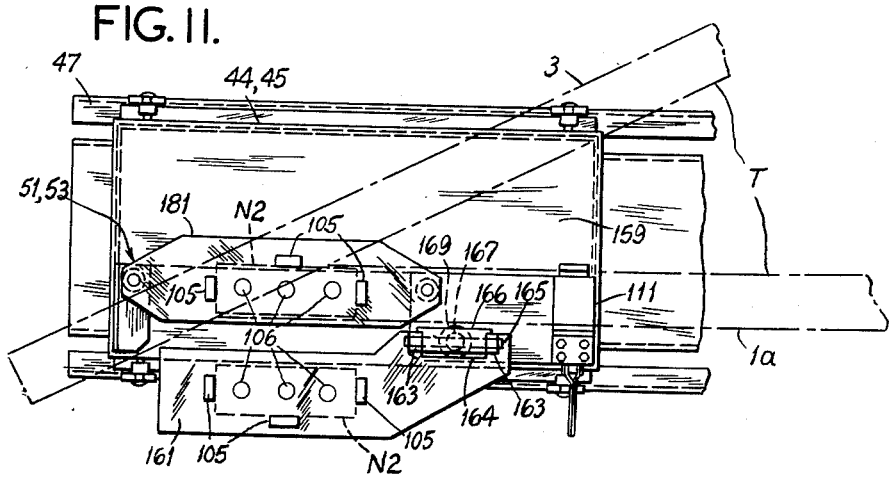

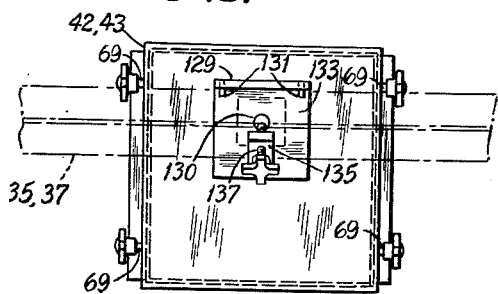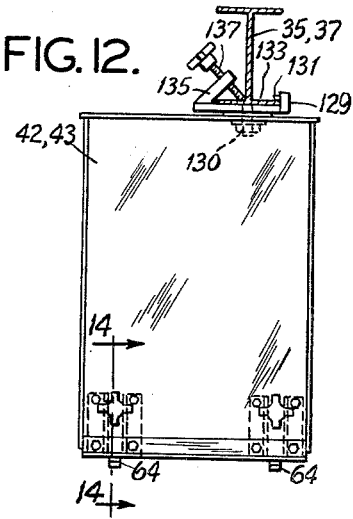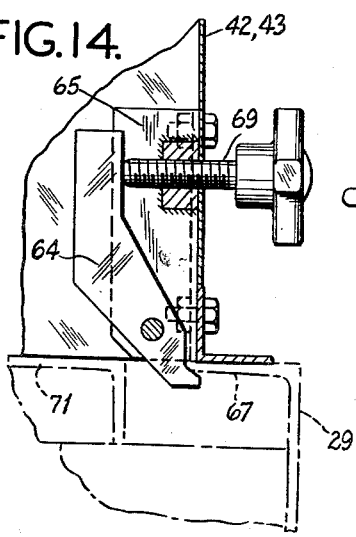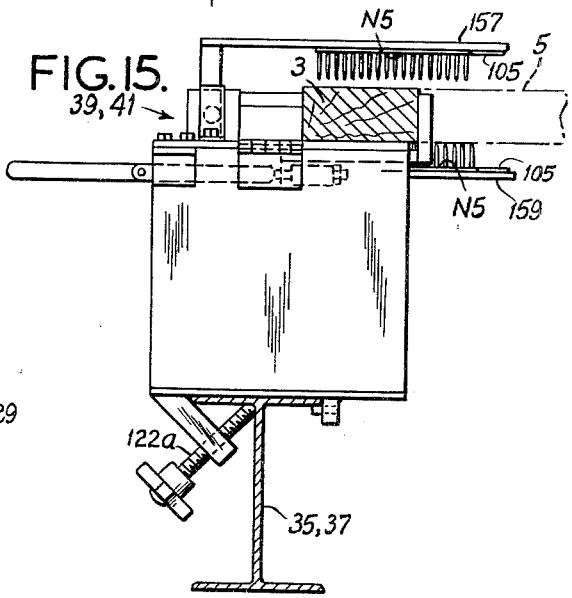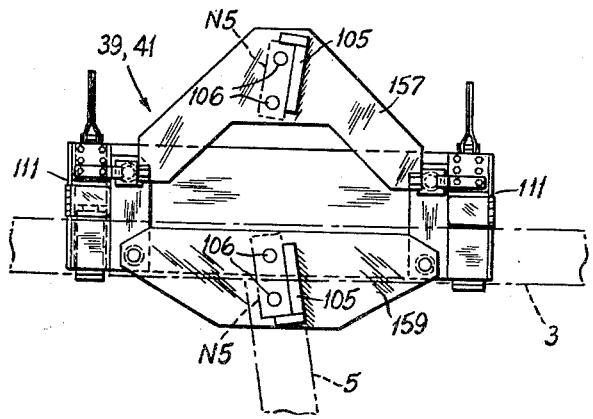

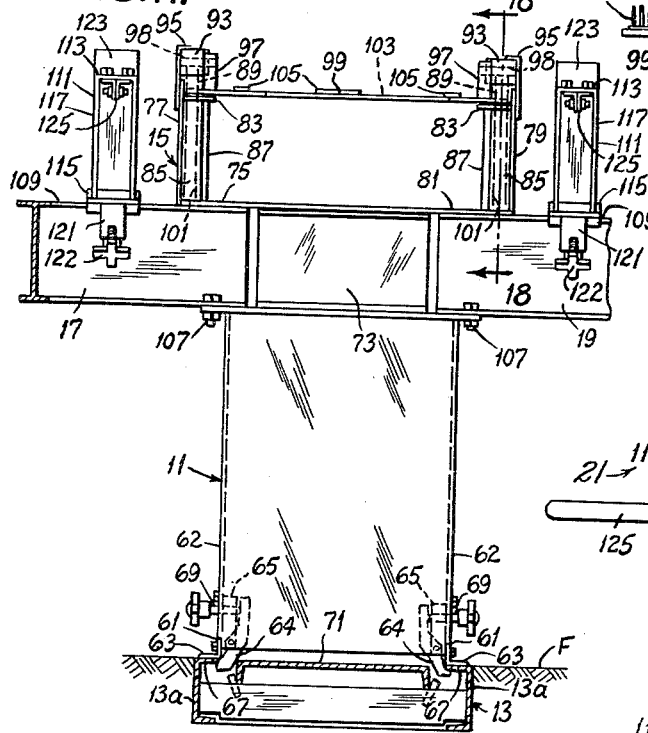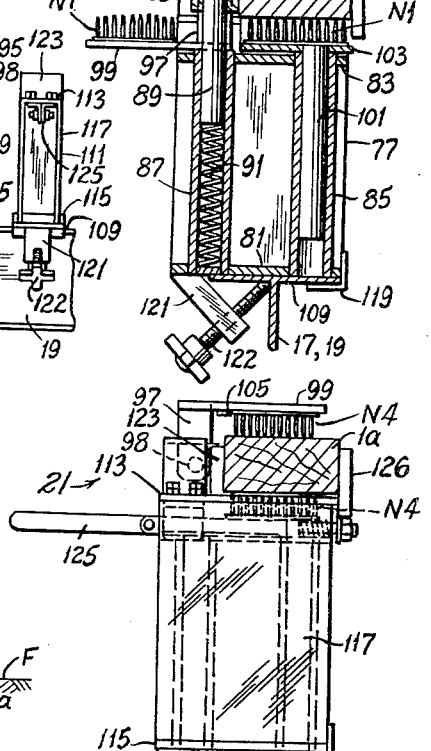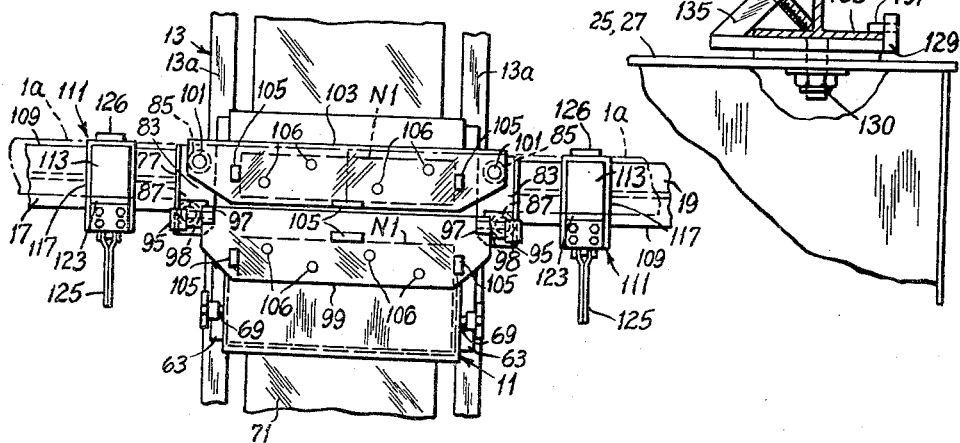

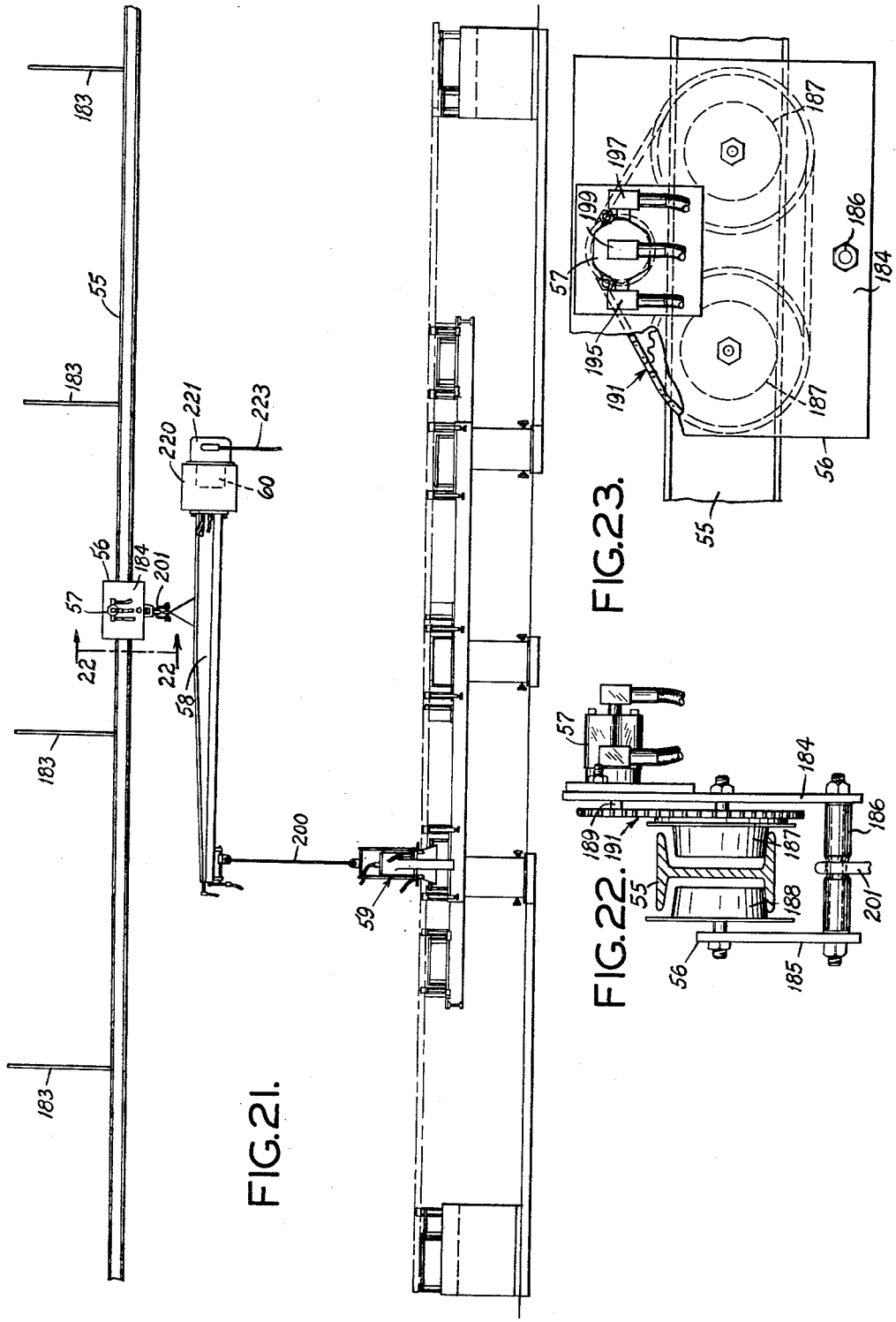

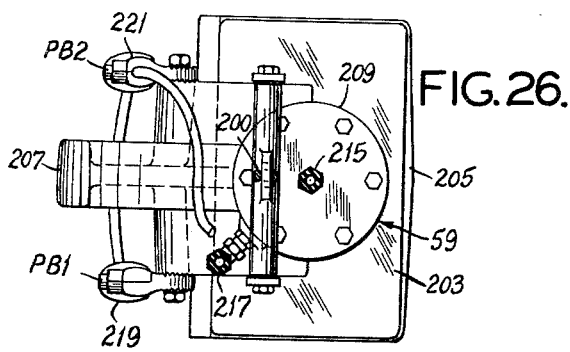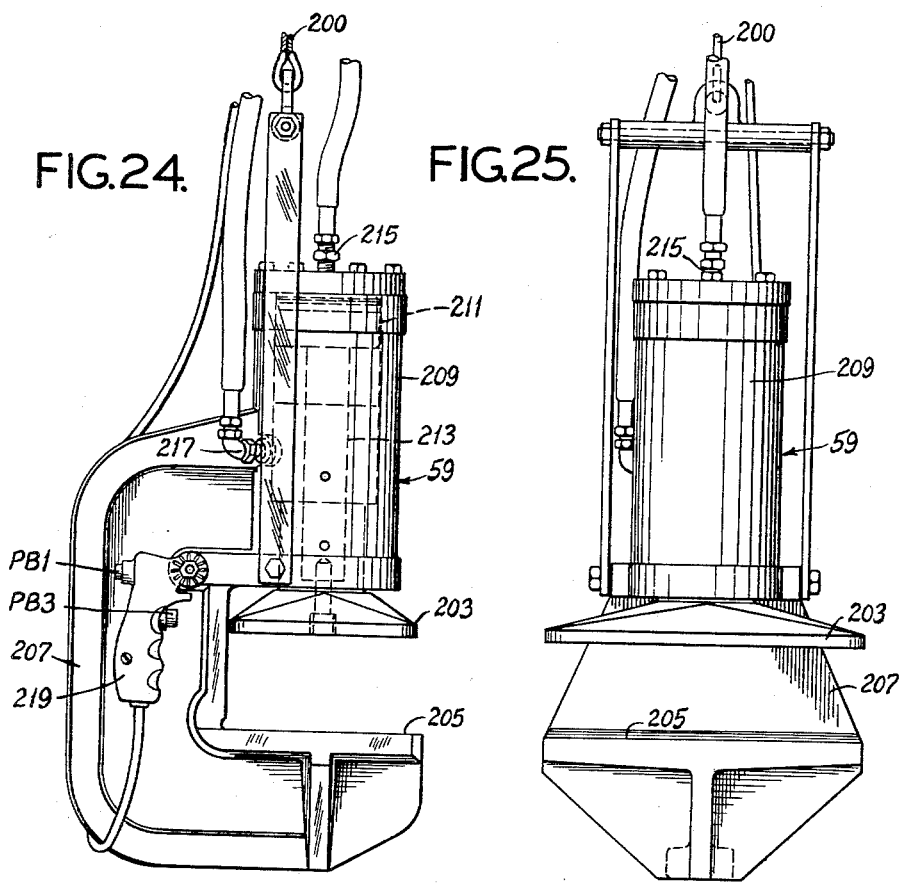

Dec. 25, 1962 W. G. MOEHLENPAH ETAL 3,069,684
APPARATUS FOR FABRICATING WOOD STRUCTURES
Filed March 13, 1961 9 Sheets-Sheet 9

United States Patent Office 3,069,684
Patented Dec. 25, 1962

3,069,684
APPARATUS FOR FABRICATING WOOD
STRUCTURES
Walter G. Moehlenpah, Ladue, and George E. Pallme, Jr., St. Louis County, Mo., assignors, by mesne assignments, to Ar-Ka Engineering, Inc., St. Louis, Mo., a corporation of Missouri
Filed Mar. 13, 1961, Ser. No. 95,356
16 Claims. (Cl. 1—149)

This invention relates to apparatus for fabricating wood structures, and more particularly to apparatus for fabricating wood roof trusses.

It will be understood that wood roof trusses are widely used in residential and commercial building construction. One such type of truss is a triangular truss consisting of a lower chord, upper chords joined to the ends of the lower chord at the heels of the truss and joined together at the peak of the truss, web members constituting compression members or struts extending from the third points of the lower chord to the midpoints of the upper chords, and web members constituting tension members or ties extending from the third points of the lower chord to the peak. This type of truss is commonly referred to as a W truss. The lower chord may consist of two lengths of lumber positioned end-to-end and spliced together at the center of the length of the lower chord. Other well known types of trusses are the hip truss, the king post and the scissors truss.

This invention is concerned with apparatus for fabricating such trusses, which functions as a jig for preliminary assembly of pre-cut lower chord, upper chord and web members of a W, hip, king post or scissors truss, which is provided with means for positioning and holding nailing plates in position to be driven into the truss members at the intersections thereof, and which is provided with movable press means for driving the nailing plates into the truss members to fasten them together, among the several objects of the invention being the provision of apparatus of this class for the economical fabrication and mass production of trusses of different dimensions; the provision of apparatus of this class which may be readily adjusted for the fabrication of a W, hip, king post or scissors truss; the provision of apparatus of this class wherein the various truss members may be clamped in proper position prior to driving the nailing plates; the provision of apparatus of this class from which a completed truss may be readily removed; and the provision of apparatus of this class which is relatively economical in construction and reliable in operation. In one embodiment of the apparatus, a special hydraulic press system is used for driving the nailing plates into the truss members, and it is contemplated that this hydraulic press system may be useful for purposes other than wood truss fabrication. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, FIG. 1 is a plan view of the jig assembly apparatus of this invention set up for the fabrication of a W truss, the truss members being shown by broken lines;

FIG. 2 is a rear elevation of the apparatus shown in FIG. 1;

FIG. 3 is a plan view similar to FIG. 1 showing the apparatus set up for the fabrication of a scissors truss;

FIG. 4 is a plan view of the apparatus of FIG. 1 set up for the fabrication of a hip truss;

FIG. 5 is an enlarged vertical section taken on line 5—5 of FIG. 1, the truss member being omitted;

FIG. 6 is a section taken on line 6—6 of FIG. 5;

FIG. 7 is a plan view of FIG. 6;

FIG. 8 is an enlarged horizontal section taken on line 8—8 of FIG. 6;

FIG. 9 is an enlarged vertical section taken on line 9—9 of FIG. 1;

FIG. 10 is a vertical section taken on line 10—10 of FIG. 9, with a lower chord member shown in section and with certain parts moved to a different position shown in dotted lines;

FIG. 11 is a plan view of the structure shown in FIG. 9;

FIG. 12 is an enlarged vertical section taken on line 12—12 of FIG. 1 with the upper chord of the truss omitted;

FIG. 13 is a plan view of the structure shown in FIG. 12, showing an upper chord beam by broken lines;

FIG. 14 is an enlarged vertical section taken on line 14—14 of FIG. 12;

FIG. 15 is an enlarged vertical section taken on line 15—15 of FIG. 1 with certain parts moved to a different position and an upper chord member shown in section;

FIG. 16 is a plan view of the structure shown in FIG. 15 on a smaller scale with certain parts moved to a different position;

FIG. 17 is an enlarged vertical section taken on line 17—17 of FIG. 1 with a lower chord member of the truss omitted;

FIG. 18 is an enlarged vertical section taken on line 18—18 of FIG. 17 with a lower chord member shown in section;

FIG. 19 is a plan view of the structure shown in FIG. 17;

FIG. 20 is an enlarged vertical section taken on line 20—20 of FIG. 1 with certain parts removed, other parts moved to a different position and a lower chord member shown in section;

FIG. 21 is a rear elevation of the complete apparatus of this invention, including the hydraulic press system;

FIG. 22 is an enlarged vertical section taken on line 22—22 of FIG. 21;

FIG. 23 is a side elevation of FIG. 22 with parts broken away;

FIG. 24 is an enlarged side elevation of the hydraulic press shown in FIG. 21;

FIG. 25 is a front elevation of the press;

FIG. 26 is a plan view of the press;

Corresponding reference characters indicate corresponding parts throughout the several views of the drawings.

Figure 27:
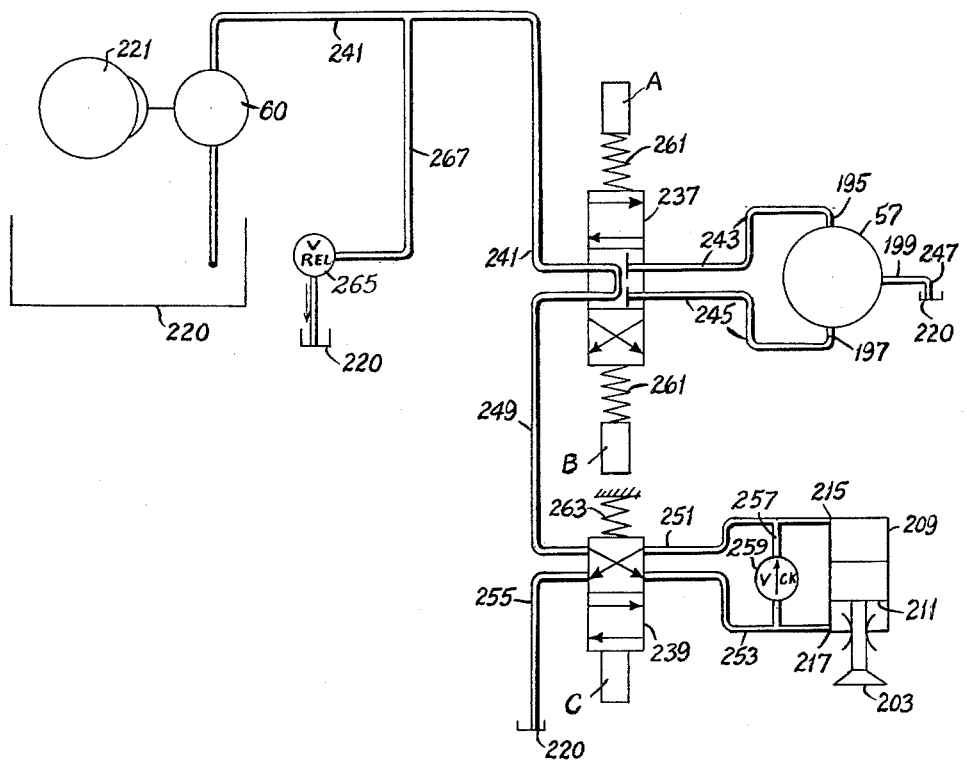
FIG. 27 is a hydraulic circuit diagram.

Referring to the drawings, FIG. 1 shows an apparatus constructed in accordance with this invention arranged for assembling and nailing pre-cut wood members to form a triangular or W roof truss T, such as shown in broken lines. As shown, truss T comprises a lower chord 1, upper chord members 3 which intersect at the peak of the truss, web members or struts 5 which extend between the third points on the lower chord to the mid-points of the upper chords, and web members or ties 7 which extend between the third points of the lower chord and the peak of the truss. The lower chord 1 is shown as consisting of two pieces, each designated 1a, which are to be spliced in end-to-end butting relation at the center of the lower chord of the truss by lower chord nailing plates such as indicated by N1, one on each face of the truss. These plates are hereinafter referred to as lower chord splice nailing plates. The outer ends of the lower chord members 1a are to be fastened to the upper chords 3 by nailing plates such as indicated at N2, one on each face of the truss. These plates are hereinafter referred to as heel nailing plates. The upper ends of the upper chords 3 and the ties 7 are to be fastened together by nailing plates such as indicated at N3, one on each face of the truss. These plates N3 are hereinafter referred to as peak nailing plates. The lower ends of the struts 5 and ties 7 are to be fastened to the lower chord by nailing plates such as indicated at N4, one on each face of the truss. Plates N4 are hereinafter referred to as lower chord nailing plates. The upper ends of the struts 5 are to be fastened to the upper chords 3 by nailing plates such as indicated at N5, one on each face of the truss. Plates N5 are hereinafter referred to as upper chord nailing plates.

FIGS. 3 and 4, respectively, show the apparatus as it appears when set up for assembling a typical scissors truss ST and a typical hip truss HT. As shown in FIG. 3, scissors truss ST comprises lower chord members S1a which meet at the center of the truss, upper chord members S3 which meet at the peak of the truss, web members S5 which extend in a generally horizontal direction between the intersection of the lower chords to points on the upper chords, and web members S7 which extend from the peak of the truss to the intersection of the lower chords and between the intersections of web members S5 with the upper chords and points on the lower chords. Nailing plates N1–N5 are shown in FIG. 3 for connecting the members together at the intersections thereof. Hip truss HT (FIG. 4) comprises a lower chord member H1, an upper chord comprising horizontal member H3 and inclined members H5 extending between the ends of member H3 and the ends of the lower chord, generally vertical web members H7 extending between the upper chord and the lower chord, and inclined web members H9. The lower chord consists of two pieces, each designated H1a, which are spliced in end-to-end butting relation with the center of the lower chord. Nailing plates N1–N5 are shown in FIG. 4 for connecting the members together at the intersections thereof.

Apparatus constructed in accordance with this invention for assembling and nailing pre-cut wood members to form any of the trusses such as above described is shown to comprise a first pedestal designated in its entirety by the reference character 11. This pedestal, hereinafter referred to as the splice pedestal, is slidable heightwise of the truss on a center track generally indicated at 13. The splice pedestal carries a locater plate assembly 15, hereinafter referred to as the splice locater plate assembly, for holding splice nailing plates N1 in position to be driven into the lower chord members (such as 1a in the case of the W truss) at the butting ends thereof to splice these members together.

A pair of beams 17 and 19 are pivotally mounted at one end thereof on the splice pedestal 11 and project laterally outward on opposite sides thereof. Locater plate assemblies 21 and 23 are slidable along beams 17 and 19, respectively. These locater plate assemblies, hereinafter referred to as lower chord locater plate assemblies, are for holding the lower chord nailing plates N4 in position to be driven into the lower chord and the web members at the intersections thereof. The beams 17 and 19 are supported adjacent their outer ends by pedestals 25 and 27. Each of these pedestals, hereinafter referred to as a lower chord pedestal, is slidable heightwise of the truss on a track 29. A pedestal 31, hereinafter referred to as the peak or top center pedestal, is slidable heightwise of the truss on the center track 13. The peak pedestal carries a peak or top center locater plate assembly 33 for holding peak nailing plates N3 in position to be driven into the truss members at the intersection thereof at the peak or top center of the truss.

A pair of beams 35 and 37 are pivotally mounted at one end thereof on the peak pedestal 31 and project outwardly on opposite sides thereof. Locater plate assemblies 39 and 41, hereinafter referred to as upper chord locater plate assemblies, are slidable along the beams 35 and 37, respectively, and are for holding upper chord nailing plates N5 in position to be driven into the upper chords and web members at the intersections thereof. The beams 35 and 37 are supported adjacent their outer ends by pedestals 42 and 43. Each of these pedestals, hereinafter referred to as an upper chord pedestal, is slidable heightwise of the truss on a respective track 29. Pedestals 44 and 45, hereinafter referred to as heel pedestals, are slidable laterally of the truss on lower tracks 47 and 49, respectively. These heel pedestals carry locater plate assemblies 51 and 53, hereinafter referred to as heel locater plate assemblies, for holding heel nailing plates N2 in position to be driven into the upper and lower chord members at the intersections thereof.

Referring to FIG. 21, a hydraulic press system of this apparatus is shown to include a track or I-beam 55, a carriage 56 movable along the track, a hydraulic motor 57 for driving the carriage in one direction or the other along the track, a hanger beam 58 suspended from the carriage, a hydraulic press 59 suspended from the beam and adapted for driving the nailing plates, and a hydraulic pump 60 for pumping hydraulic fluid to both the motor and the press.

The splice pedestal 11 is shown in FIG. 17 to be of generally rectangular box shape and may have a height of about two feet, for example. Angle irons 61 are attached to sides 62 of the pedestal at the bottom thereof and have flanges 63 extending horizontally outward from the pedestal. These flanges slide on channel-section rails 13a of the center track 13. These rails are set in a recess in floor F with their upper surfaces flush with the floor. The splice pedestal 11 is movable forward toward the peak pedestal 31 and rearward away from the peak pedestal. Clamps 64 are pivotally mounted on brackets 65 (see FIG. 14 for enlarged detail of a clamp and bracket) inside the pedestal and extend below upper flanges 67 of the rails 13A. These clamps may be moved into a position gripping flanges 67 to lock the pedestal to the rails by means of manually operable clamp screws 69. A floor plate 71 is located at floor level between the rails.

An I-beam 73 is fixed to the top of the splice pedestal 11 as by welding, and the splice locater plate assembly 15 is attached to the top flange of this I-beam. The splice locater plate assembly 15 comprises a generally U-shaped frame 75. The legs of the U constitute sides 77 and 79 of the frame and the base of the U constitutes a bottom plate 81. This is mounted on top of I-beam 73. Inwardly extending horizontal flanges 83 are provided on the sides 77 and 79 of frame 75 adjacent the upper edges thereof. Each of these flanges is provided with two holes for reception of vertical front and rear tubular guides 85 and 87. These tubular guides extend down to the bottom plate 81 and have their lower ends fixed in holes in plate 81. Each of the rear tubular guides 87 has a rod 89 vertically slidable therein. A coil spring 91 located within each of the rear tubular guides 87 reacts from the bottom plate 81 to bias the respective rod 89 upward. Each rod 89 has a head 93 at its upper end engageable with the upper end of the respective tubular guide 87 to limit the downward movement of the rod. Stops 95 are mounted on the sides 77 and 79 of frame 75 and extend into the path of the heads 93 on rods 89 to limit the upward movement thereof. Arms 97 are pivoted on heads 93 as indicated at 98. An upper locater plate 99 is fixed to the free end of the arms 97. Each of the front tubular guides 85 has a rod 101 vertically slidable therein. A lower locater plate 103 is secured to the upper ends of rods 101.

The locater plates 99 and 103 may have nailing plate positioning strips 105 detachably secured thereto by screws, for example, for accurately positioning nailing plates thereon. The locater plates may be constructed of a nonmagnetic material, such as aluminum, for example, and may be provided with permanent magnets as indicated at 106 for holding nailing plates in place thereon. It will be observed that the mode of mounting the upper locater plate 99 allows it to be swung from a retracted position (FIG. 18) to an operative position (as in FIG. 20) and then driven downward against the upward return bias of springs 91. The mode of mounting the lower locater plate 103 allows it to be driven upward. Thus, nailing plates positioned on the locater plates may be driven into intersecting truss members located therebetween. With the upper locater plate 99 swung back in retracted position, a nailing plate may be readily applied thereto (see FIG. 18).

Beams 17 and 19, which may be conventional I-beams, for example, are pivotally attached to the splice pedestal 11 as indicated at 107. The top flange 109 of each beam is slightly below the lower face of the bottom plate 81 of the frame 75 for permitting free movement of the beams. These beams project laterally outward from the splice pedestal about seven feet, for example.

A truss member clamp unit 111 is slidably mounted on the flange 109 of each of beams 17 and 19. Each of these units comprises top and bottom plates 113 and 115, respectively, and side plates 117, the ends being open. The top plates 113 support the truss members with these members slightly above the lower nailing plate N1 carried on the lower locater plate 103. A lip 119 at the front of the clamp unit slidably engages the lower face of the flange 109. An inclined arm 121 extends down from the bottom plate 115 of the clamp unit toward the web of the beam. A manually operable clamping screw 122 is threaded in a tapped hole in the arm 121 for clamping the unit at various positions along the beam. A fixed jaw member 123 extends vertically upward from the top plate 113 of clamp unit 111. A conventional pull clamp having an operating lever 125 is located within the clamp unit and is adapted to move a jaw member 126 toward the fixed jaw member 123 when the lever 125 is moved downward from a horizontal position to a vertical position to clamp a wood truss member, such as a 2" x 4" or a 2" x 6" wood member, in position on top plate 113.

Each of the lower chord locater plate assemblies 21 and 23 is similar to the splice locater plate 15. However, the lower chord locater plate assemblies are slidably mounted on the beams 17 and 19 in the same manner as the clamp units 111, i.e., each locater plate assembly (see FIG. 20) has a forward lip 119a similar to lip 119 slidably engaging the lower face of the flange 109 and a manually operable clamping screw 122a similar to screw 122 for clamping the locater plate assembly in position along the beam. It will be understood that the detail of assembly 21 is the same as the detail of assembly 23 except that the parts of the assembly 21 are arranged oppositely to the parts of the assembly 23. The shapes of the upper and lower locating plates of the lower chord locater plate assemblies may be different from the shape of the splice locater plates because the truss members intersect at the lower chord locater plates at a different angle. Hence, the lower chord nailing plates N4 must be positioned on the locater plates accordingly. Clamp units 111 are mounted on both sides of the lower chord locating plate assemblies and are fixed thereto by welding, for example, so that the locater plate assembly and the two clamp units associated therewith may be moved along the beam as a unit.

Lower chord pedestals 25 and 27 are slidably mounted on tracks 29 for movement of the pedestals heightwise of the truss. Each track 29 is similar to the center track 13 and the pedestals 25 and 27 are mounted on the tracks 29 in the same manner as the splice pedestal 11 is mounted on the center track. A plate 129 (see FIG. 20) is pivotally mounted as indicated at 130 at the top of each lower chord pedestal. This plate has a lip 131 slidably engaging the forward upper face of lower flange 133 of each beam. An arm 135 extends from the plate 129 at the rearward edge thereof upward and inclined toward the web of the I-beam. A manually operable clamping screw 137 is threaded in a tapped hole in the arm 135. Thus, when a lower chord pedestal is moved forward or rearward, plate 129 will pivot on top of the pedestal as it moves therewith and the respective beam 17 or 19 will slide on the plate 129 as the distance between the splice pedestal and the lower chord pedestal changes.

Peak or top center pedestal 31 (FIGS. 5–8) is slidably mounted on track 13 in the same manner as splice pedestal 11. The peak pedestal is substantially box-shaped, but has a rectangular cutout portion 139 immediately below a top pedestal plate 141 and rearward of a forward wall 142. The peak locater plate assembly 33, which is substantially identical to the splice locater plate assembly 15, is attached as by welding, for example, to the top pedestal plate 141. The shape of the upper and lower locating plates of the peak locater plate assembly is different from the shape of the splice locater plates so as to accommodate the truss members intersecting at the peak or top center of the truss, and consequently the upper and lower locating plates of the peak assembly are respectively designated 143 and 145.

Each of the beams 35 and 37, which may be about eleven feet in length, for example, is pivotally mounted at one end thereof in the cutout portion 139 of the peak pedestal 31 as indicated at 147. This mounting includes an angle bar 149 extending between the sides of the peak pedestal 31 and having one flange 150 thereof projecting horizontally into the cutout portion 139. A horizontal pivot plate 151 and a vertical gusset plate 153 are attached to each beam at the inner end thereof, the plates 151 being pivotally mounted on the flange 150 on a common axis by a pin 155. Each beam carries a clamp unit 111 slidably mounted thereon for clamping truss members in position to have nailing plates driven into the intersections thereof.

Each of the upper chord locater plate assemblies 39 and 41 (see FIG. 15) is similar to the lower chord locater plate assemblies and is slidably mounted for movement along the respective beam in the same manner as the lower chord locater plate assemblies are mounted on the beams 17 and 19. However, upper and lower locater plates 157 and 159 of these assemblies are shaped differently than the lower chord locater plates and the nailing plate positioning strips 105 are arranged differently to accommodate the nailing plates N5 at the intersection of the upper chord member and the web members at the upper chord locater plate assemblies (see FIG. 16). A clamp unit 111 is attached to each of the upper chord locater plate assemblies and is movable therewith along the respective beams.

Upper chord pedestals 42 and 43 (FIG. 12) are slidably mounted on tracks 29 for heightwise movement of the pedestals in the same manner as the lower chord pedestals 25 and 27. The pedestals 42 and 43 also have pivot plates 129 mounted on the tops thereof for permitting movement of the pedestals and at the same time slidably supporting the respective beams 35 and 37.

Heel pedestals 44 and 45 are slidably mounted for movement laterally of the truss on the tracks 47 and 49, respectively, in the same manner as the previously described pedestals are mounted on their respective tracks. The tracks 47 and 49 extend laterally outward from the tracks 29 for about eleven and one-half feet, for example. FIGS. 9–11 show the detail of heel pedestal 44, and it will be understood that the detail is the same for the other heel press except that parts on the pedestal 44 are arranged oppositely to the parts on pedestal 45. This will be apparent from FIGS. 1–4. Heel pedestal 44 has a cutout portion 159 at the upper forward corner thereof. When the apparatus is arranged for the construction of a scissors truss, as shown in FIG. 3, the beams 35 and 37 may extend past the heel pedestals through these cutout portions.

The heel locater plate assemblies 51 and 53 are somewhat different than the other locater plate assemblies. Each assembly 51 and 53 includes upper and lower locater plates for holding nailing plates N2, but since the upper chord members 3 or S3 may extend past the intersection thereof with the lower chord members 1 or S1 (see FIGS. 1 and 3), each of assemblies 51 and 53 must be so constructed as to permit this. For this purpose, the outer end of the upper locater plate 161 of each heel locater plate assembly is free from any obstructing pivoting mechanism. Plate 161 has arms 163 (see FIGS. 9 and 11) on opposite sides of a notch 164 adjacent its inner end. Arms 163 straddle and are pin-connected as indicated at 165 to a head 166 at the upper end of a rod 167. Rod 167 extends down through a vertical tubular guide 169 and is vertically slidable in this guide, being biased upward by tension springs 171. Rod 167 extends through a bracket 173 at the lower end of guide 169, and has a crossbar 175 at its lower end. Springs 171 are interconnected between this crossbar and bottom plate 177 of the heel locater plate assembly. Screws 179 threaded in tapped holes in bracket 173 act as adjustable stops limiting the upward movement of the rod 167. The lower locater plate of the heel locater plate assembly is designated 181. It is mounted in the same manner as the previously described lower locater plates. The heel locater plates are shaped differently and the positioning strips 105 are arranged differently from the previously described locater plate assemblies to accommodate the truss members intersecting at the heels of the truss. One clamp unit 111 is attached to the inner end of each heel locater plate assembly for clamping a lower chord truss member in position. Clamp units, similar to units 111, may also be provided on the locater plate assemblies 21, 23, 39 and 41 for holding the web members of the truss in position.

The I-beam or track 55, as shown in FIG. 21, is suspended from the roof or ceiling (not shown) by a plurality of hangers 183. However, it will be understood that this beam could just as well be supported on columns. The carriage 56 comprises side plates 184 and 185 located on opposite sides of track 55 and tied together as indicated at 186. Side plate 184 carries wheels 187 and side plate 185 carries wheels 188 riding on the upper surface of the lower flanges of the track 55. Wheels 187 are driven from output shaft 189 of hydraulic motor 57 via a chain and sprocket drive 191. Motor 57 is mounted on side plate 184 of the carriage. Motor 57 has three ports 195, 197 and 199. Hydraulic fluid under pressure is supplied to port 195 to actuated the motor to drive the carriage in one direction, while supplying fluid to port 197 will actuate the motor in reverse direction thereby to drive the carriage in the other direction. Port 199 is a drain port. Hanger beam 58 is suspended from the carriage 56 by a swivel connection 201 which permits the hanger beam to be swung around the carriage a full 360°.

Hydraulic press 59 is shown in FIGS. 21 and 24-26 to be supported from one end of the beam 58 by a cable 200, and comprises a rectangular movable upper platen 203 and a fixed lower platen 205. The lower platen forms a part of a generally C-shaped press frame 207. Also forming a part of the frame is a hydraulic cylinder 209. A piston 211 is provided in the cylinder and has a piston rod 213 to the lower end of which is fixed the upper platen 203. Hydraulic fluid may be pumped through an inlet 215 to the upper end of the cylinder, thereby forcing the piston 211 and platen 203 downward. The piston is raised by forcing fluid through an inlet 217 into the lower end of the cylinder. Handles 219 and 221 are provided on the frame, one on each side thereof. A push button switch PB1 is provided on handle 219 and a similar push button switch PB2 is provided on handle 217. A third push button PB3 is provided on handle 219. Switches PB1 and PB2 control the movement of carriage 56 to the right or left as viewed in FIG. 21, while switch PB3 controls the movement of piston 211 and platen 203. Electrical and hydraulic circuits including the switches are hereinafter more fully described.

Hydraulic pump 60 is a conventional hydraulic pump and is shown to be mounted in a tank or sump 220 on the right end of the hanger beam 58 as shown in FIG. 21. An electric motor 221 is mounted on the tank for driving the pump. The motor is supplied with current from an electrical source (not shown) through line 223. The pump supplies hydraulic fluid under pressure to the hydraulic motor 57 and press 59 through suitable line connections, portions of which appear in FIG. 21.

Figure 28:
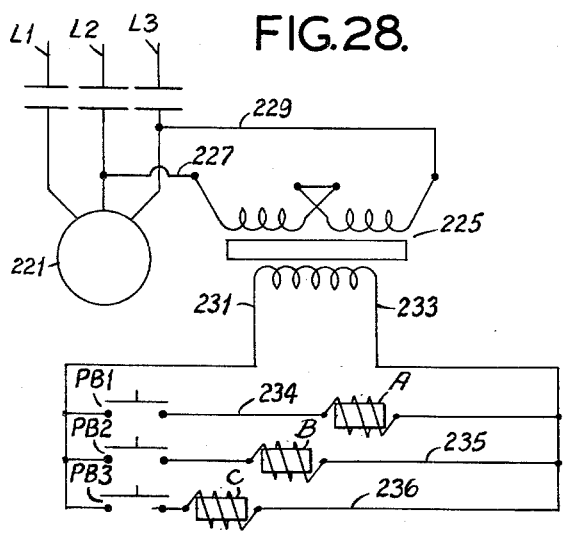
FIG. 28 is a wiring diagram.

FIG. 27 shows the hydraulic circuit and FIG. 28 the electrical circuit for operating the hydraulic motor 57 and the press 59. The motor is supplied with power from a three-wire source L1, L2 and L3. The primary of a step-down transformer 225 is connected across lines L2 and L3 by lines 227 and 229. The secondary of the transformer feeds lines 231 and 233. Switch PB1 is connected across lines 231 and 233 in a line 234 including a solenoid A. Switch PB2 is connected across lines 231 and 233 in a line 235 including a solenoid B. Switch PB3 is connected across lines 231 and 233 in a line 236 including a solenoid C. Solenoids A and B actuate a three-way valve 237 which controls hydraulic motor 57, and solenoid C actuates a two-way valve 239 which controls press cylinder 209. The outlet of pump 60 feeds line 241 which leads to valve 237. Line 243 extends from valve 237 to port 195 of the motor 57. Line 245 connects port 197 of motor 57 to valve 237. Line 247 connects relief port 199 of motor 57 to the tank or sump 220. Line 249 connects valve 237 to valve 239. Line 251 connects valve 239 to the upper end of the press cylinder 209. Line 253 connects the lower end of the press cylinder to valve 239. Line 255 connects valve 239 to the tank or sump 220. A by-pass line 257 including a check valve 259 interconnects lines 251 and 253. Check valve 259 is adapted to open for flow from line 253 to line 251.

Valve 237 has a normal position in which line 241 is interconnected through the valve with line 249, and lines 243 and 245 are blocked at the valve (see FIG. 27). Solenoid A, when energized, moves valve 237 down as viewed in FIG. 27 to a position in which line 241 is interconnected with line 243 and line 245 is interconnected with line 249. Solenoid B, when energized, moves valve 237 up as viewed in FIG. 27 to a position in which line 241 is interconnected with line 245, and line 243 is interconnected with line 249. Valve return springs such as indicated at 261 are provided for returning the valve to normal position on deenergization of the one or the other solenoid.

Valve 239 has a normal position in which line 249 is interconnected with line 253 and line 251 is interconnected with line 255. Solenoid C, when energized, moves valve 239 up as viewed in FIG. 27 to a position in which line 249 is interconnected with line 251 and line 253 is interconnected with line 255. A return spring such as indicated at 263 is provided for returning valve 239 to normal position on deenergization of solenoid C.

While work on trusses is proceeding pump 60 is continuously driven by motor 221. With switches PB1, PB2 and PB3 open, and solenoids A, B and C deenergized, hydraulic fluid is delivered from pump 60 via line 241, valve 237, line 249, valve 239 and line 253 to the lower end of the press cylinder 209. The upper end of the press cylinder is vented via line 251, valve 239 and line 255. Accordingly, press piston 211 is held up, and line 257 including check valve 259 by-passes fluid from line 253 to line 251. To actuate the press (i.e., drive piston 211 downward), switch PB3 is closed to energize solenoid C and move valve 239 upward as viewed in FIG. 27. Fluid is thereupon delivered via line 241, valve 237, line 249, valve 239, and line 251 to the upper end of the press cylinder 209, and the lower end of the cylinder is vented via line 253, valve 239 and line 255, whereupon the piston is driven downward. For pressure relief when the piston reaches the lower limit of its stroke, a pressure relief valve 265 is provided in a line 267 connected to line 241.

To move the carriage 56 to the right as viewed in FIG. 21, switch PB1 is closed to energize solenoid A and move valve 237 downward as viewed in FIG. 27. Fluid is thereupon delivered via line 241, valve 237, and line 243 to port 195 of motor 57, and the motor is vented via port 197, line 245, valve 237, line 249, valve 239, line 253, line 257 including check valve 259, line 251, valve 239, and line 255. This drives the motor in such direction as to move the carriage to the right. To move the carriage 56 to the left as viewed in FIG. 21, switch PB2 is closed to energize solenoid B and move the valve 237 upward as viewed in FIG. 27. Fluid is thereupon delivered via line 241, valve 237, and line 245 to port 197 of motor 57, and the motor is vented via port 195, line 243, valve 237, line 249, valve 239, line 253, line 257 including check valve 259, line 251, valve 239, and line 255. This drives the motor in the opposite direction to move the carriage to the left.

Assuming that the apparatus has been previously set up for fabricating a scissors truss as shown in FIG. 3, for example, and that it is desired to fabricate a W truss as shown in FIG. 1, for example, the operation is as follows:

The peak and upper chord pedestals 31 and 42, 43, respectively, are moved along the tracks 13 and 29, respectively, until the beams 35 and 37 are positioned at an angle corresponding to the pitch of the upper chord members 3 of the truss to be fabricated and the desired height of the truss is reached by the peak pedestal. These pedestals are then locked in position by clamps 64. The heel pedestals 44 and 45 are moved along the tracks 47 and 49, respectively, to positions appropriate for the span of the truss to be fabricated and locked in those positions by clamps 64. The splice and lower chord pedestals 11, 25, 27, respectively, are adjusted along the tracks 13 and 47, 49, respectively, to positions aligned with the lower chord members 1a of the truss to be fabricated and locked in those positions by clamps 64.

The upper chord and lower chord locater plate assemblies 39, 41 and 21, 23, respectively, are then adjusted along the respective beams 35, 37 and 17, 19 to positions in which it is desired to have the web members 5 and 7 intersect with the upper and lower chord members 3 and 1a. The locater plate assemblies are then locked in those positions by the screws 122a.

The upper locater plates of all the locater plate assemblies are swung to an open or retracted position, as shown in FIG. 1. Nailing plate positioning strips 105 are then attached to the locater plates of all the locater plate assemblies by screws, for example, the strips 105 being arranged on each locater plate to position the desired shape of nailing plate thereon.

The top and bottom nailing plates N1—N5 are placed on the locating plates of the several locater plate assemblies. Pre-cut truss members having properly cut ends are then clamped in the positions shown by the broken lines in FIG. 1 by the several clamping units 111 with the intersections of the members being located over the lower nailing plates. The upper locater plates of the several locater plate assemblies with the upper nailing plates N1—N5 thereon are swung to their operative position, i.e., the upper locater plates are positioned over the intersections of the truss members.

The hydraulic press 59 is then moved by driving the carriage 56 along the track 55 and/or swinging the beam 58 about the carriage to any one of the locater plate assemblies, with the upper platen 203 being positioned over the upper locater plate and the lower platen 205 being positioned under the lower locater plate. Switch PB3 is actuated and the upper platen moves downward onto the upper locater plate. When the upper platen 203 engages the upper locater plate and exerts pressure thereon, the resistance of the upper nailing plate against the truss members causes the lower platen 205 to be raised against the lower locating plate and the lower nailing plate against the truss members. The platens press the locater plates toward each other and the nailing plates are driven into the intersecting truss members. When the upper and lower nailing plates have been fully driven into the truss members, which is a matter of a second or so, the switch PB3 is opened and the press platens separate. The lower locating plate falls away from the truss member due to gravity and the upper locating plate is lifted away from the truss members by the action of coil springs 91 on the rods 89 in tubular guides 87.

The press is then moved to each of the other locater plate assemblies and the above described operation repeated. After all of the nailing plates have been driven into the truss members, the upper locating plates are swung to open or retracted position, and the clamping units 111 are opened. The entire truss may then be removed from the apparatus.

While the upper and lower chord pedestals are shown to be slidably mounted in tracks 29 and provided with clamps 64 for locking the pedestals to the tracks, it is contemplated that these pedestals may be provided with roller casters and an electromagnet at the lower end thereof, the casters riding on a magnetic plate and permitting the pedestals to be moved to various positions at which the electromagnet may be energized to lock the pedestal to the magnetic plate, such as described in our co-pending application Serial No. 44,621, filed July 22, 1960. In such a pedestal, the upper chord locating plate assemblies would be positioned on the pedestals and the beams 35 and 37 would not be needed.

It will be understood that the splice pedestal could be fixed to the floor and the splice locater plate assembly could be made to slide one foot off center either way on the beams 17 and 19, in the same manner that locating plate assemblies 21 and 23 are slidable on beams 17 and 19, as for splicing together a fourteen-foot member and a sixteen-foot member, for example.

It will be seen that the apparatus described herein can be utilized to fabricate a W truss, a scissors truss or a hip truss without extensive adjustments.

In view of the above, it will be seen that the several objects of the invention are achieved and other advantageous results atained.

As various changes could be made in the above constructions without departing from the scope of the invention, it is intended that all matter contained in the above description or shown in the accompanying drawings shall be interpreted as illustrative and not in a limiting sense.

We claim:

1. Apparatus for fabricating wood trusses of the type having lower chord members, upper chord members, and web members extending from the lower chord member to the upper chord members, comprising a first pedestal movable heightwise of the truss, a first locater plate assembly mounted on said first pedestal for holding nailing plates in position to be driven into the lower chord members at the intersection thereof, a second pedestal movable heightwise of the truss, a second locater plate assembly mounted on said second pedestal for holding nail plates in position to be driven into the upper chord members at the intersection thereof, third pedestals movable laterally of the truss, third locater plate assemblies mounted on said third pedestals for holding nailing plates in position to be driven into the upper and lower chord members at the intersections thereof, fourth pedestals located between the first and third pedestals movable heightwise of the truss, guide beams extending between said fourth pedestals and said first and said second pedestals, and fourth locater plate assemblies carried by said beams for holding nailing plates in position to be driven into the web members and the upper and lower chord members at intersections thereof.

2. Apparatus for fabricating wood trusses of the type having at least one lower chord member, upper chord members, and at least one web member extending from the lower chord member to the upper chord members, comprising a plurality of pedestals, clamp means supported by said pedestals for holding the truss members in position to be nailed together, a press for driving nailing plates upwardly in a generally vertical direction, and means above said pedestals supporting said press for universal movement whereby the press may be moved into positions for driving the nailing plates upwardly into the truss members at intersections thereof.

3. Apparatus for fabricating wood trusses of the type having at least one lower chord member, upper chord members, and at least one web member extending from the lower chord member to the upper chord members, comprising a plurality of pedestals, a plurality of locater plates supported by said pedestals for holding nailing plates in position to be driven into the truss members at intersections thereof, a press adapted for driving said locater plates upwardly in a generally vertical direction, and means above said pedestals supporting said press for universal movement whereby the press may be moved into positions for driving nailing plates on said locater plates upwardly into the truss members at intersections thereof.

4. Apparatus as set forth in claim 3 wherein said pedestals are movable to various positions for forming different sizes and types of trusses.

5. Apparatus as set forth in claim 3 further comprising a plurality of tracks, said pedestals being supported on and movable along said tracks to various positions for forming different sizes and types of trusses.

6. A locating plate assembly for holding nailing plates in position to be driven into the intersection of members positioned for forming a truss, comprising a pair of locater plates, means on one locater plate for holding a nailing plate on one face thereof, each of said locater plates being mounted for movement in a generally vertical direction, said one locater plate also being mounted for pivotal movement from a retracted position to an operative position, whereby a nailing plate may be positioned on said one locater plate when said one locater plate is in retracted position and positioned adjacent said intersection upon movement of said one locater plate from retracted to operative position.

7. A locating plate assembly as set forth in claim 6 wherein said means for holding a nailing plate on said one face comprises a permanent magnet attached to said one locater plate.

8. A locater plate assembly for holding nailing plates in position to be driven into the intersection of members positioned for forming a truss, comprising a pair of locater plates, means on one locater plate for holding a nailing plate on one face thereof, means mounting each of said locater plates for movement in a generally vertical direction, means mounting said one locater plate for pivotal movement from a retracted position at which said one locater plate is laterally displaced from the other locater plate to an operative position at which said one locater plate is in substantial vertical alignment with said other locater plate, whereby a nailing plate may be positioned on said one locater plate when said one locater plate is in retracted position and positioned adjacent said intersection upon movement of said one locater plate from retracted to operative position.

9. A locater plate assembly as set forth in claim 8 wherein said means mounting said one locater plate for pivotal movement and for movement in a generally vertical direction comprises at least one vertical tubular guide, a rod slidably received in said guide, a pivotal connection between said one locater plate and said rod, and spring means biasing said rod upward.

10. A locater plate assembly as set forth in claim 8 wherein said means mounting said other locater plate for movement in a generally vertical direction comprises a pair of vertical tubular guides, and rods slidably received in said guides and connected to said other locater plate.

11. In apparatus for fabrication of wood trusses or the like having means for holding truss members in assembled position and for holding nailing plates in position to be driven into the truss members at intersections thereof, an overhead track, a carriage movable on the track, means for driving the carriage in one direction or the other on the track including a hydraulic motor on the carriage, a beam pivotally suspended from the carriage, a hydraulic press suspended from one end of the beam adapted for driving nailing plates, a hydraulic pump and driving means therefor mounted on the other end of the beam, and hydraulic connections between said pump and said motor and said press.

12. Apparatus for fabricating wood trusses of the type having a lower chord member, upper chord members, and web members extending from the lower chord member to the upper chord members, comprising a plurality of locater plate assemblies for holding nailing plates in position to be driven into the truss members at intersections thereof, each locater plate assembly having a generally horizontal lower locating plate for holding a nailing plate in position to be driven upwardly into the truss members located thereabove, means guiding said lower locating plate for generally vertical movement toward and away from said truss members, said lower locating plate being biased downwardly away from said truss members, a press for driving said lower locating plates upwardly toward the truss members located thereabove, said press having upper and lower platens, and means above said locating plate assemblies supporting said press for universal movement whereby the press may be moved to a position at each locater plate assembly wherein the upper platen is located above the intersecting truss members and the lower platen is located below the lower locating plate.

13. Apparatus as set forth in claim 12 including a plurality of pedestals supporting said locater plate assemblies, said pedestals being movable to various positions for forming different sizes and types of trusses.

14. Apparatus as set forth in claim 12 further comprising a plurality of pedestals supporting said locater plate assemblies, and a plurality of tracks, said pedestals being supported on and movable along said tracks to various positions for forming different sizes and types of trusses.

15. Apparatus as set forth in claim 12 wherein said means guiding said lower locating plate for generally vertical movement toward and away from said truss members comprises a pair of members extending downward from said lower locating plate, and guide means for guiding said members for generally vertical sliding movement.

16. In apparatus for fabrication of wood trusses or the like having means for holding truss members in assembled position for nailing plates to be driven into the truss member at intersections thereof, an overhead track, a carriage movable in one direction or the other on the track, a beam pivotally suspended from the carriage, a hydraulic press suspended from one end of the beam adapted for driving the nailing plates, a hydraulic pump and driving means therefor mounted on the other end of the beam, and hydraulic connections between said pump and said press.

References Cited in the file of this patent

UNITED STATES PATENTS

| | | |
|---|---|---|
| 2,540,106 | Eichelberger | Feb. 6, 1951 |
| 2,552,304 | Arter | May 8, 1951 |
| 2,919,733 | Johnson | Jan. 5, 1960 |
| 2,940,608 | Underwood | June 14, 1960 |
| 2,996,721 | Black | Aug. 22, 1961 |

UNITED STATES PATENT OFFICE
CERTIFICATE OF CORRECTION

Patent No. 3,069,684                  December 25, 1962

Walter G. Moehlenpah et al.

It is hereby certified that error appears in the above numbered patent requiring correction and that the said Letters Patent should read as corrected below.

In the grant, lines 2 to 4, for "assignors, by mesne assignments, to Engineering, Inc., of St. Louis, Missouri, a corporation of Missouri," read -- assignors, by mesne assignments, to Ar-Ka Engineering, Inc., of St. Louis, Missouri, a corporation of Delaware, --; line 13, for "Engineering, Inc., its successors" read -- Ar-Ka Engineering, Inc., its successors --; in the heading to the printed specification, lines 6 and 7, for "a corporation of Missouri" read -- a corporation of Delaware --.

Signed and sealed this 23rd day of April 1963.

(SEAL)
Attest:
ERNEST W. SWIDER                          DAVID L. LADD
Attesting Officer                            Commissioner of Patents